Jan. 4, 1938. R. H. RUSSELL 2,104,311
PROCESS FOR CREATING HIGH TEMPERATURES
Original Filed Aug. 23, 1932  3 Sheets-Sheet 1
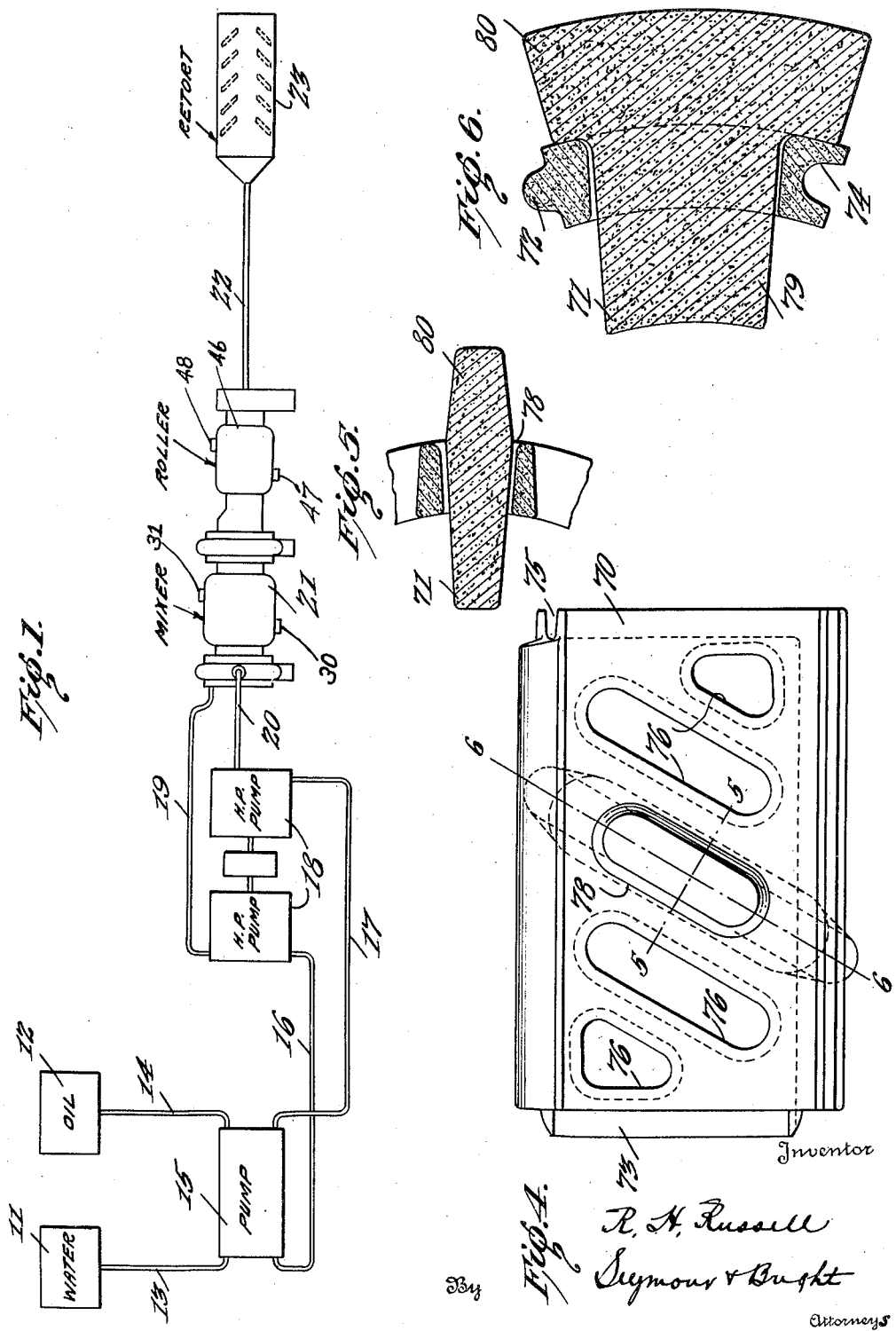

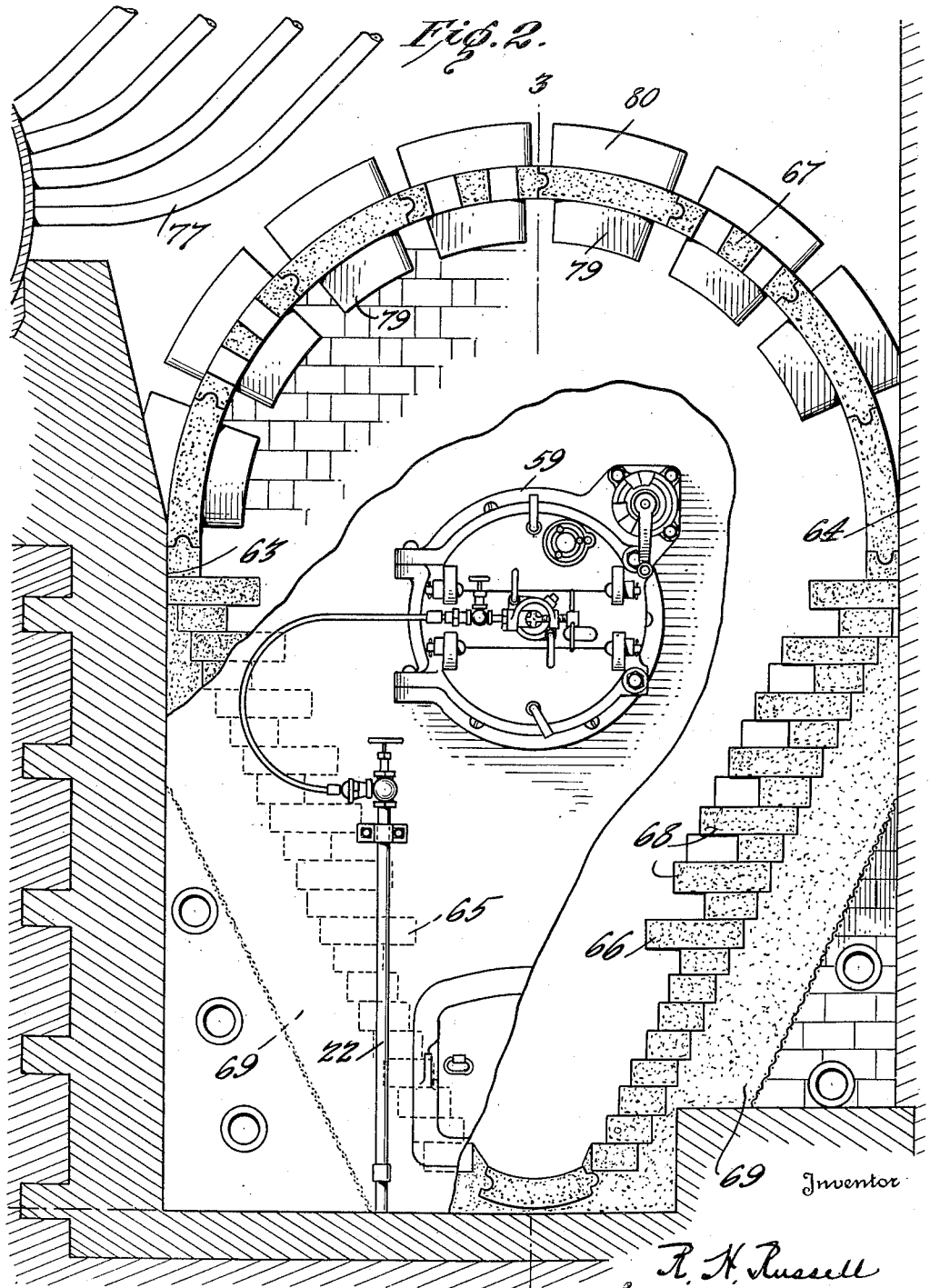

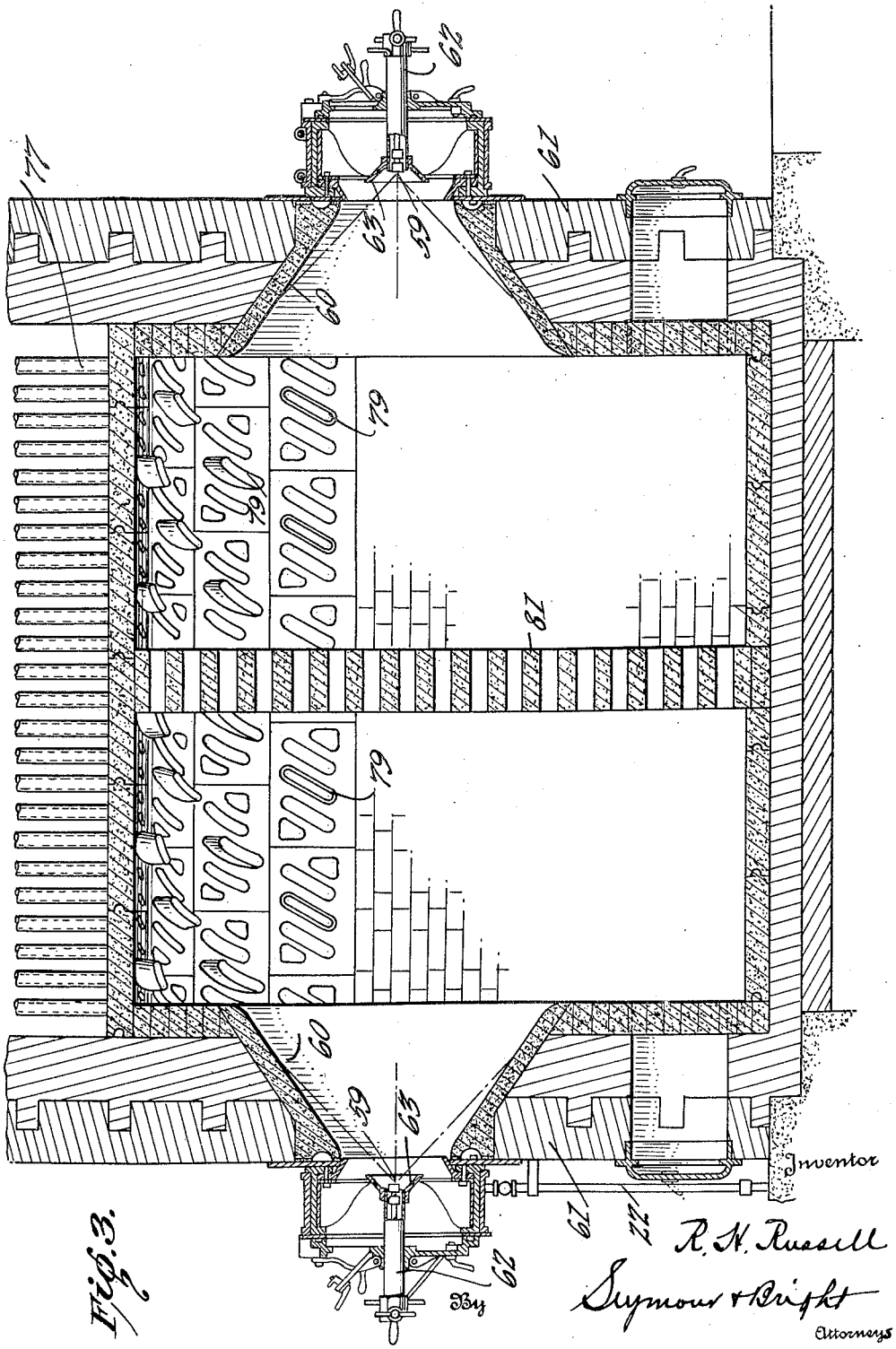

Patented Jan. 4, 1938

2,104,311

UNITED STATES PATENT OFFICE

2,104,311

PROCESS FOR CREATING HIGH TEMPERATURES

Robert H. Russell, Cleveland, Ohio, assignor, by mesne assignments, to Gas Fuel Corporation, a corporation of Delaware Application August 23, 1932, Serial No. 630,151
Renewed May 26, 1937

7 Claims. (Cl. 158—117.5)

This invention relates to an improved process for creating high temperatures by the combustion of liquid fuels composed of oil and water.

In accordance with the invention, a hydrocarbon liquid such as bunker oil, crude oil or the like, is mixed with water, and the mixture violently agitated. Preferably, the oil and water are preheated prior to or during agitation. After thorough mechanical agitation, the mixture is rolled to further mix and stabilize the two fluids and the result is a true emulsion free of air or the like. If desired, the mixture, during the rolling, may also be heated so that the mixture leaving the rollers will be preferably at a temperature of about 150 to 175° F.

My experiments show that the emulsion may vary from about 70% oil and 30% water to about 24% oil and 76% water. Mixtures containing 50% or more of water and less than 50% of hydrocarbon liquid apparently make better fuels. Theoretically, a mixture containing about 76% water and 24% oil is the best fuel, as it will sustain combustion without the use of air, however, due to the varying carbon content of the oil, and the presence of water in crude and fuel oils, mixtures containing from 50 to 60% of water are the most practical.

The mixture or emulsion of oil and water heated to about 150 to 175° F. which is discharged from the roller, is atomized at high super-atmospheric pressure, say from about 500 to 2000 pounds per square inch, into a retort or reaction chamber built into a furnace or the like. The atomizer may be of conventional construction, however, the aperture is preferably much smaller than that used in ordinary practice, say from 20 to 35 thousandths of an inch, as this size is sufficient, owing to the high pressures used.

In accordance with the invention, the retort or reaction chamber into which the atomized emulsion is introduced, is of special construction in order to radiate heat back toward the zone of atomization, whereby the emulsion immediately upon introduction into the retort or reaction chamber, is instantaneously raised to a relatively high temperature ranging say from about 2000 to 4000° F. At the beginning of the combustion operation, air or other oxygen containing gas is necessary to build up the temperature, but after optimum temperature conditions are obtained, the amount of air introduced may be reduced until eventually it is about one-quarter of the amount used in the beginning. Theoretically, the air can be entirely eliminated after the maximum temperature has been reached.

I line the retort or reaction chamber with carborundum brick or the like, as ordinary fire brick is incapable of withstanding the heat produced, and I so arrange the brick that tips project from the same inwardly toward the zone of atomization, and these tips in the operation of the furnace, are heated to incandescence, and these incandescent points radiate the high temperature toward the point of atomization. The brick-work construction is also such that tips or points are directed toward the parts to be heated by the combustion gases, for instance, a shell boiler, boiler tubes or the like.

I also prefer to arrange within the combustion chamber, a perforated partition of checker-work brick which will extend across the retort and also form means for radiating heat back toward the zone of atomization.

The wall or arch of the retort constructed of the special bricks heretofore mentioned, also provides passageways for the discharge of highly heated combustion gases from the retort to the part or parts to be heated by said gases.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a flow diagram of an apparatus of a type suitable for carrying out the new process.

Fig. 2 is a front elevation partly in vertical transverse section, of a portion of one type of furnace which may be used for burning the improved fuel mixture or emulsion.

Fig. 3 is a longitudinal vertical sectional view of the furnace taken on the line 3—3 of Fig. 2.

Fig. 4 is an elevation of one of the special brick assemblies which I employ in the arch or wall of the retort.

Fig. 5 is a sectional view of the same on the line 5—5 of Fig. 4.

Fig. 6 is a similar view on the line 6—6 of Fig. 4.

Referring first to Fig. 1, it will be noted that 11 is a water reservoir and 12 an oil reservoir. Pipes 13 and 14 lead the water and oil respectively from these reservoirs to a double acting pump 15 which acts to force the water and oil streams separately through pipes 16 and 17 into a double acting high pressure metering or proportioning pump 18. The pump 15 acts to force the water and oil under pressure into the pump 18. The latter places a pressure of anywhere from about 500 to 2000 pounds per square inch on the water and oil streams, and the water stream is discharged through a pipe 19, and the oil stream through a pipe 20. These pipes have their outlets connected to the intakes of the special mixer and rolling device 21. From the rolling device, the mixture or emulsion of oil and water under the pressure produced by the pump 18, is passed through a conduit 22 and into a special retort 23, illustrated in detail in Figs. 2 to 6 inclusive.

Referring to the mixing and rolling device it will be noted that the mixture flowing through the mixer may be heated by providing the mixer with a hollow jacket through which a fluid heating agent may be passed from an inlet 30 to an outlet 31.

The roller is also surrounded by a hollow jacket 46 through which a heating fluid may be circulated from an inlet 47 to an outlet 48.

The mixture in passing through the roller will be tightly squeezed, and this will result in stabilization of the emulsion, which is finally discharged through the pipe 22 and enters the atomizer 59 which leads into the retort shown in Figs. 2 and 3.

From the outlet of the mixing chamber to the inlet 55 of the rolling chamber, the mixture or emulsion under high pressure passes along the intermediate portion of the driving shaft, and as the only outlet of the wall 53 of the rolling chamber is at the end 57 of the rolling device, it is obvious that the mixture in passing through the rollers will be tightly squeezed, and this will result in stabilization of the emulsion.

The stabilized emulsion is finally discharged from 57 into a chamber 58 within the casting 26, and from that chamber it passes through the pipe 22 (Fig. 1) and enters the atomizer 59 which leads into the retort shown in Figs. 2 and 3.

Referring to the last mentioned figures, it will be noted that the atomizer sprays the emulsion in a cone-shaped stream into the conical throat 60 positioned in a wall 61 of a furnace or the like, and at the beginning of the combustion operation, air, either preheated or not, is fed under pressure through a pipe 62 into a mixing cone 63 which surrounds the tip of the atomizer.

As heretofore mentioned, the retort is such as to highly heat the atomization zone, which may be defined as the portion of the retort between the inlet and the outlet of the cone 60; and in accordance with the invention, this special retort is built within the walls of a furnace. For the purpose of disclosing the invention, the retort is of the dual type, that is, the emulsion alone, or admixed with air, may be introduced into either end of the retort, but for the purpose of description, it is believed only necessary to describe the portion of the retort which cooperates with the atomizing features heretofore mentioned. Accordingly, it will be noted that the lower portion of the retort is arranged between substantially parallel walls 63 and 64, and the lower portions 65 and 66 of the walls of the retort converge downwardly from the arch or roof 67 of the retort. These walls of the retort are of special construction and are made up of carborundum or like bricks which are so arranged as to provide tips 68 that extend toward the longitudinal axis of the retort to provide incandescent projections which tend to retain as well as radiate heat toward the center of the retort to assist in highly heating the fuel mixture atomized into the retort.

Any suitable insulation 69 may be arranged between the walls 65, 66 of the retort and the walls 63, 64 of the furnace.

The arch or roof of the retort is also of a particular construction and is preferably made up of carborundum bricks of the type best shown in Figs. 4 to 6 inclusive. These bricks are of two forms, one 70 being apertured and the other 71 forming projections, one of which is adapted to pass through an aperture of one of the apertured bricks. Each brick 70 is provided at one of its longitudinal edges with a bead 72, and at one of its side edges with a similar bead 73. The other edges of this brick are provided respectively with complementary grooves 74 and 75 adapted to receive the projecting beads of adjacent bricks 70 as shown in Figs. 2 and 3 when the arch elements are assembled.

The bricks 70 are apertured as shown at 76 to permit the discharge of combustion gases from the retort through the arch for the purpose of heating boiler tubes 77 or any other parts which are to be heated by the gases. The bricks 70 are also apertured as shown at 78 to receive inner projections 79 of the tip-bricks 71. It will be clear from the drawings that these projections 76 extend into the combustion space of the retort, and during the operation of the furnace they are heated to incandescence. Therefore, they radiate heat back into the central portion of the retort and toward the zone of atomization, with the result that extremely high temperatures are maintained within the retort. In actual operation, it has been found that this temperature reaches as high as 4000° F.

Each of the tip bricks has a projecting head 80 which rests on the outer surface of one of the apertured bricks 70 to prevent the tip brick from falling through the arch, and the head 80 of the tip brick also forms an outwardly projecting part or extension which radiates heat outwardly away from the arch to assist in heating the boiler tubes 77 which are heated by the combustion gases.

A bridge wall or perforated partition 81, formed of checker-work carborundum bricks or the like, extends across the interior of the retort and also acts to radiate heat back toward the zone of atomization for the purpose of maintaining that zone in highly heated condition, whereby the finely atomized emulsion entering the retort under high pressure is immediately subjected to high temperature, and this results in substantially perfect combustion, as it has been found that the interior of the retort is free of carbon, even after the furnace has been in operation for long periods of time.

In operation, as soon as the temperature in the retort or combustion chamber reaches the point where dissociation of the water results due to chemical reactions which take place, it has been noted that the character of the flame changes from that of an ordinary oil flame to that of a gas flame, also the ultimate temperature is greatly increased, ranging from 3000 to 4000° F., depending upon the pressure on the atomizer, which naturally increases the input of fuel. The increase in temperature is apparently due to the formation of hydrogen and the subsequent combustion thereof. Possibly, also, large amounts of carbon monoxide are formed.

The water vapor formed by the combustion of hydrogen will, on coming in contact with the incandescent points 79 and the partition 81, if any unconsumed carbon be present, be again dissociated and the process repeated, thus giving substantially complete combustion, which is evidenced by the clean condition of the brick work after operation and analysis of the stack gases.

It is also possible that some cracking of the hydrocarbons takes place throughout the process.

The furnace is so constructed as to permit fine adjustment of combustion air, and after the proper temperature is built up in the retort, the amount of combustion air introduced may be greatly reduced, about one-quarter of the amount used to burn straight fuel oil being necessary for complete combustion of the oil-water emulsion. In fact, when mixtures containing over 50% of water are used, the air may be entirely cut off.

It is my theory that this reduction of combustion air has a great advantage, as ordinary air contains approximately 75% of nitrogen, which interferes with good contact between the reacting elements. In the combustion of hydrogen in air, the nitrogen cools the flame by absorbing heat. By eliminating 75% of the combustion air used in the ordinary combustion of fuel oil, 75% less nitrogen is present to absorb heat and retard combustion. The necessary additional oxygen is supplied by the water in the mixture. Consequently, in this process there is apparently from three to four times more oxygen within the range of the flame than in the ordinary process of combustion.

The flame produced may be used for many purposes, but it is particularly valuable in heat treating steel and iron, due to the presence of large quantities of hydrogen. The hydrogen reduces the oxide of iron formed, thus preventing the formation of scale. As previously stated, it is possible that carbon monoxide is also present, or can be produced by controlling the combustion air. The presence of carbon monoxide would also be beneficial as the iron oxide ordinarily present when steel or iron is heated in an ordinary flame, would be broken down into iron and carbon dioxide. Further, carbon, when heated to a high temperature, readily unites with oxygen and will remove oxygen from metallic oxides, carbon monoxide or carbon dioxide, depending upon the amount of carbon present. If a small amount is present, carbon dioxide is formed. If a large amount is present, carbon monoxide is formed. In addition, carbon at 1000° C. will reduce carbon dioxide to carbon monoxide.

From the foregoing it is believed that the invention may be readily understood by those skilled in the art, and it is apparent that changes may be made in the process and apparatus, without departing from the spirit of the invention, as expressed in the claims.

What is claimed and desired to be secured by Letters Patent is:

1. A process of combustion comprising the steps of atomizing an emulsion of water and hydrocarbon oil and introducing the same under high superatmospheric pressure into a retort, introducing air from an extraneous source into the retort for supporting combustion, effecting combustion within the retort, and radiating heat resulting from the combustion to the zone of atomization for the purpose of rapidly heating the atomized emulsion to a high temperature as it is introduced into the retort.

2. A process of combustion comprising the steps of atomizing an emulsion comprising water and hydrocarbon oil and introducing the same in atomized condition under a pressure of at least 500 pounds per square inch into a retort, introducing air from an extraneous source into the retort for supporting combustion, effecting combustion within the retort, and radiating heat resulting from the combustion to the zone of atomization for the purpose of rapidly heating the atomized emulsion to a high temperature as it is introduced into the retort.

3. A process of combustion comprising the steps of preheating an emulsion comprising water and hydrocarbon oil, then atomizing the emulsion while introducing it into a retort, introducing air from an extraneous source into the retort for supporting combustion, effecting combustion within the retort, and radiating heat resulting from the combustion to the zone of atomization for the purpose of rapidly heating the atomized emulsion to a high temperature as it is introduced into the retort.

4. A process as claimed in claim 3 in which the emulsion is preheated to a temperature of at least 150° F. before it is atomized.

5. A process as claimed in claim 3 in which the emulsion is preheated to a temperature of at least 150° F. before atomization and is introduced into the retort under a pressure in excess of 500 pounds per square inch.

6. A process of combustion comprising the steps of preheating an emulsion consisting of water and hydrocarbon oil, placing said emulsion under a pressure in excess of 500 pounds per square inch, then atomizing the emulsion while introducing it into a retort maintained at a temperature above 2000° F., simultaneously introducing air from an extraneous source into the retort for supporting combustion, effecting combustion within the retort and thereby maintaining incandescent zones within the retort, and radiating heat from said incandescent zones to the zone of atomization whereby the atomized emulsion is rapidly heated to a temperature in excess of 2000° F. as it is introduced into the retort.

7. A process of combustion comprising the steps of preheating an emulsion comprising water and hydrocarbon oil, placing said water and oil while in liquid phase under a pressure in excess of 500 pounds per square inch, then atomizing the emulsion and lowering the pressure on the same to substantially atmospheric pressure while introducing it into a retort, introducing a combustion-supporting gas from an extraneous source into the retort simultaneously with the introduction of the emulsion for supporting combustion, effecting combustion within the retort and thereby maintaining incandescent zones within the retort, and radiating heat from the incandescent zones to the zone of atomization for the purpose of rapidly heating the atomized emulsion to a temperature in excess of 2000° F. as it is introduced into the retort.

ROBERT H. RUSSELL.